Feb. 26, 1952

C. G. HARREL ET AL 2,586,945

NONSOGGING PIECRUST MIX

Filed Sept. 20, 1947

Symbol Key
Filling
Crust
Filling & Crust Mixed
Voids
Moisture

Inventors
Chastain G. Harrel
Mary H. Kimball
Robert O. Brown
By Williamson & Williamson
Attorneys Patented Feb. 26, 1952

2,586,945

UNITED STATES PATENT OFFICE 2,586,945

NONSOGGING PIECRUST MIX

Chastain G. Harrel, Robert O. Brown, and Mary H. Kimball, Minneapolis, Minn., assignor to Pillsbury Mills, Inc., Minneapolis, Minn., a corporation of Delaware Application September 20, 1947, Serial No. 775,216

2 Claims. (Cl. 99—92)

This invention relates to non-sogging pie crust mixes and to processes for preparing the same.

The common ingredients employed in pie crust mixes are shortening, flour, and salt to which a small amount of water is added. When pies are made having a liquid filling and the pie crust is prepared in the usual fashion, the lower crust in the baked pie is generally found to be quite soggy, giving a poor flavor, texture, and appearance to the lower crust as well as causing the lower crust to stick to the baking pan. Part of the sogginess of the lower crust may be attributed to the fact that the lower crust, while the pie is being baked and while it is being heated from the bottom upward, absorbs moisture from the liquid filling above it. Also the moisture found in the crust, as originally prepared, does not readily escape from the lower crust during the cooking of the pie and a considerable portion of the original moisture of the lower crust remains therein. The degree of sogginess of the lower crust depends considerably on the skill and experience of the cook baking the pie, but even when liquid-filled pies are baked by the best cooks, sogging of the lower crust is, and long has been, a problem to overcome.

In attempts to prevent sogging of the lower pie crust when liquid-filled pies are being made, various expedients have been employed. In some instances the lower crust, after being placed in the baking pan, is given a preliminary cooking period before the liquid filling is inserted in the baking pan. This expedient is fairly successful but requires considerable additional time and work on the part of the cook. In other instances an attempt has been made to seal off the top of the lower crust from the liquid filling by painting the top surface of the lower crust with egg white preparatory to insertion of the liquid filling in the bake pan. While the layer of egg white at the top surface of the lower crust during the cooking of the pie has a tendency to coagulate prior to the time that the major portion of the lower crust hardens and thereby seals off the top of the lower crust from the liquid filling there above, difficulties are encountered when the egg-painted pie crust is employed. The coagulation of the egg coating at the top of the crust takes place prior to the hardening of the crust below it, and thus the coagulated egg coating tends to seal in the moisture below the upper surface of the lower crust, preventing the upward escape of steam from the moisture of the lower crust as the heat penetrates from the bottom of the lower crust upwardly through the same. This often leads to rupture of the seal coating and subsequent bleeding of liquid from the liquid filling into the main body of the lower crust through breaks in the seal coating. Also much of the moisture in the lower crust remains trapped therein. For these reasons painting the top surface of the lower crust with egg white is not a solution to the problem inasmuch as a soggy lower crust still results when the painted egg white method is employed.

Except for the use of egg white in painting the upper surface of a lower pie crust preparatory to baking, to our knowledge egg white has not been utilized in pie crust dough or pie crust mixes.

It is the general object of the present invention to produce a pie crust mix which, when made up into a lower crust of a liquid-filled or non-liquid-filled pie, after the pie is baked, will produce a dry, light, flaky, non-soggy lower crust that will not stick to the baking pan, the mix being capable of use with favorable results by inexperienced pie bakers and without preliminary cooking of the lower crust before the pie filling is inserted therein.

We have discovered that by adding a small quantity of egg white to the other usual ingredients, namely, shortening, flour, and salt employed in making a pie crust and thoroughly mixing the egg white added to these other ingredients, the lower crusts of pies prepared from such pie crust mixes will be free from the objectionable sogginess of other pies even when liquid-filled pies, such as juicy fruit pies, pumpkin pies, custard pies, and the like are prepared.

A typical pie crust mix can be made in accordance with the invention composed of the following ingredients, the proportions being given by weight.

| | Per cent |
|---|---|
| Shortening | 32.00 |
| Flour | 65.75 |
| Salt | 2.00 |
| Dried egg white (egg albumin) | 0.25 |

The four ingredients are thoroughly mixed together so that the egg white will be spread evenly throughout the mix. In preparing a pie crust from the mix referred to, a small quantity of water is added and the pie crust is rolled out, whereupon the pie is made in the usual manner. Considerable variance can be made in the proportions of shortening relative to flour. From 0.05% to 1.00% dried egg white may be employed in the mix, it being preferred, however, that the dried egg white constitute approximately 0.25% by weight of the total mix.

As a pie having a pie crust made in accordance with our invention is cooked, the following action takes place. The heat applied to the pie first heats the lower portion of the bottom crust, the heat rising through the undercrust from the bottom upwardly thereof. The bottom portion of the undercrust is thus first heated most intensely and the egg white, which is a water soluble, heat coagulable protein, will first coagulate at the extreme bottom portion of the lower crust, forming at the bottom portion of the lower crust a surface impenetrable to soakage. As the pie continues to bake, successive strata of the lower crust become more intensely heated from the bottom upward and the egg white in the successive strata coagulates from the bottom upward toward the upper part of the lower crust. The lower crust is thus sealed off from water penetration from its bottom upwardly and the liquid constituents in the lower crust in the form of steam will be free to pass on upwardly through the higher layers in the lower crust into the filling of the pie so that entrapment of the moisture of the lower crust is not possible as in the case, for example, of a pie wherein the top surface of the lower crust is painted with egg white. A well-cooked, flaky lower crust is thus obtained, which is in no sense soggy when the pie is completely cooked. This crust of course will not stick to the bottom of the pan as is the case when a pie crust of the ordinary type is employed and a liquid filling is employed in the pie.

There are shown in the accompanying drawings three comparative sections of liquid-filled pies prepared under exactly similar conditions, cooked under identical conditions and made exactly alike except for the composition of the undercrust. These drawings were made directly from actual pies that were cooked and from photographs thereof.

Fig. 2 illustrates in vertical section a portion of a pie made under similar conditions and from similar ingredients except that no egg white is incorporated in the lower crust itself but whereon egg white has been painted in a thin layer on the upper surface of the lower crust preparatory to baking in accordance with the practice heretofore referred to.

In these three drawings certain symbols are employed for certain purposes. Thus the liquid filling of the pies is crosshatched with diagonal crosshatching lines running diagonally from their lower portions upwardly and to the left. The crust is crosshatched with diagonal crosshatching lines running diagonally from their lower ends upwardly and to the right. There is a mixing zone in each pie which remains somewhat liquified and where the filling and the pie crust have more or less run together, and this mixing zone is shown as having both the filling crosshatching and the crust crosshatching. Air bubbles or voids in the pies are indicated by irregular enclosed lines as these bubbles actually appeared in the specimens of pies from which the drawings were made. Moist areas in the various pies are indicated by stippling as these moist areas were present in the actual pies baked.

Figure 1:
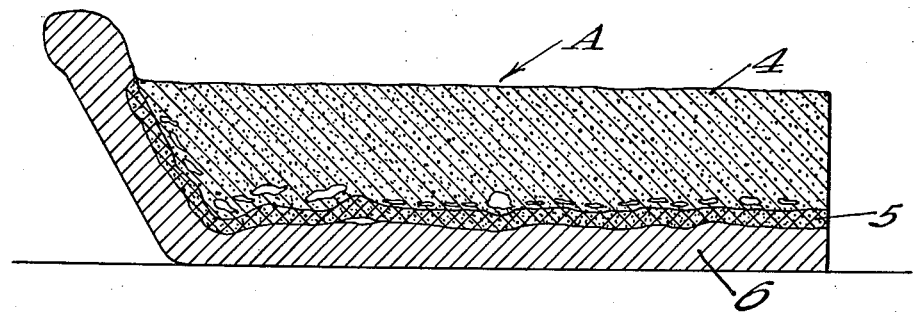
Fig. 1 illustrates in vertical section a portion of an open-topped pie having a liquid filling and wherein the bottom crust is prepared according to the invention and contains approximately 0.25% by weight egg white thoroughly mixed with the shortening, flour, and salt prior to rolling out of the crust.

Referring first to the pie A shown in Fig. 1, which is the pie having the lower crust prepared in accordance with the invention, this pie includes in reality the three layers, filling layer 4, mixing layer 5, and lower crust 6. In this pie the crust layer 6 was found to be absolutely dry, flaky, and non-soggy as is indicated. While there were a number of air bubbles which were found to occur in the liquid filling layer 4, very few air bubbles were formed in the dry crust layer 6.

Figure 2:
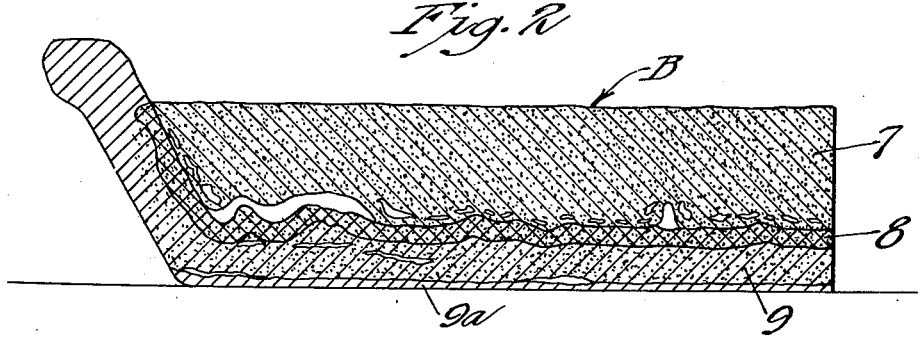

In the pie B shown in Fig. 2, which is the pie produced by painting the upper surface of the lower crust with egg white, the filling layer is designated by the numeral 7, the mixing layer is designated 8, and the crust layer is designated 9. The mixing layer 8 was quite irregular, it apparently having been disrupted by steam bubbles forming in the pie crust layer 9 during cooking. The extreme lower portion of the crust through a thin bottom zone 9a was found to be quite dry, but between the zone 9a and the mixing layer 8 the crust was found to be wet and soggy as is indicated in the drawing. Also a considerable number of voids or air bubbles were found to exist in the pie crust layer 9.

Figure 3:
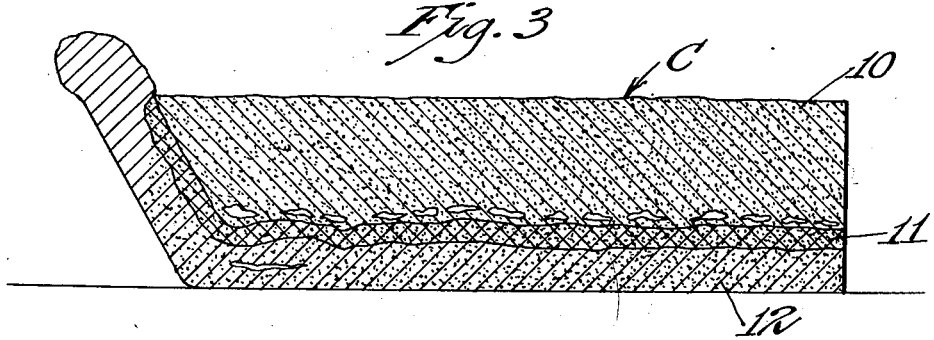
Fig. 3 illustrates in vertical section a portion of a third pie made in accordance with the usual conventional practice and under similar conditions to the pies shown in Figs. 1 and 2 and wherein the lower crust is made from similar ingredients except that it contains no egg white and wherein the upper surface of the lower crust has not been painted with egg white.

In the case of the pie C shown in Fig. 3, baked in the conventional manner without employing egg white mixed throughout the crust and without painting the upper surface of the crust with egg white, the filling layer is designated by the numeral 10, the mixing layer by the numeral 11, and the crust layer by the numeral 12. It was found that the crust 12 was quite moist and soggy from the bottom of the crust upward to the mixing zone 11 and that the pie stuck to the baking pan wherein it was baked.

The three views in the drawing very clearly illustrate the difference in baking results obtained by use of the invention as compared to results obtained when a painted crust is employed and when an ordinary pie is baked in the conventional manner. It was found through many making tests that a crisper, drier, better appearing and more palatable undercrust was obtained utilizing the mix of the invention than in the case of pies wherein the undercrust is made by any other known method. It was also found that no particular cooking skill or experience was required to secure liquid-filled pies having dry, flaky lower crusts. Nor was it necessary to precook the undercrust before filling the same with the liquid filling.

An analysis of the cooking stages of a pie made in accordance with the invention shows the following. During the first stage of the cooking the lower crust dough is in a compact mix of fat flakes, ungelatinized starch and gluten, a water soluble, heat coagulable protein formed by the egg white, and water dispersion. During the second stage of the cooking, the heat is gelatinizing the starch in the lower portion of the crust and beginning to coagulate the egg white in the lower portion of the undercrust and the fat flakes are melting forming partial voids. The upper part of the lower crust is in a state of flux so that free moisture from the liquid filling on top is drawn by the starch into the pie crust inasmuch as the starch has not reached its complete water imbibable capacity with only the water in the crust mixture. During the third stage of the cooking, the lower layers of the crust are beginning to dry out, complete gelatinization of the starch having taken place in the lower layers but not yet having taken place in the upper layers, and the egg white having coagulated from the bottom of the crust upward to seal off in successive layers the crust from penetration of moisture. The steam being generated in the upper portion of the crust, wherein gelatinization of the starch and drying out of the gelatinized starch has not been completed, is permitted to move freely into the mixing layer at the upper part of the crust and thence into the liquid filling itself so that there is no entrapment of moisture in the crust. The synerasis of the starch releases additional moisture and this moisture may freely find its way out of the crust by movement in the form of steam upwardly. During the fourth stage of the cooking, the starch in the crust has completely gelatinized and is being dried and the protein formed by the egg white is completing coagulation, the moisture being completely baked out of the crust. A crisp, non-soggy, dry, edible lower crust results when the baking is complete irrespective of the technique of the cook who is baking the pie. The coagulated egg white prevents the penetration of water from the liquid filling downwardly into the lower part of the crust after baking.

While egg white has been commonly used in the preparation of certain bakery products other than pie crust, the use of egg white evenly mixed through and permeating the lower crust of a pie to successively seal off successive layers of the lower crust from water penetration as the cooking of the pie progresses, while permitting the free escape of the water constituents of layers from the bottom of the lower crust upwardly above the sealed-off layers into the pie filling, is a new functional use of egg white having no analogy or functional equivalent in the cookery art to our knowledge.

It will be seen that there has been provided a highly beneficial pie crust mix which can be utilized with very good baking results by inexperienced cooks to produce pies wherein the lower crust will be dry, light, flaky, and non-soggy.

It is of course possible to prepare the pie crust mix in advance as a dry mix and to market it as such, the mix having the egg white thoroughly dispersed through it and mixed with the other ingredients of the mix. It is also possible to prepare a wet pie crust mix ready for use, to be held in cold storage and thereafter utilized. Also when pie crust is prepared immediately ahead of the baking of the pie, the egg white can be added to the other ingredients as the pie crust is originally compounded.

Various changes may be made in the proportions of the ingredients employed within the scope of the invention as above described and as defined in the appended claims.

We claim:

1. A piecrust mix comprising approximately two parts by weight of flour, one part by weight of shortening and 0.05% to 1.00% dried egg white, said mix producing a dry non-soggy undercrust in a baked filled pie having its crust prepared from the mix, said dried egg white being thoroughly and evenly mixed with the other ingredients.

2. A piecrust mix comprising approximately two parts by weight of flour, one part by weight of shortening and 0.25% dried egg white, said mix producing a dry non-soggy undercrust in a baked filled pie having its crust prepared from the mix, said dried egg white being thoroughly and evenly mixed with the other ingredients.

CHASTAIN G. HARREL.
ROBERT O. BROWN.
MARY H. KIMBALL.

REFERENCES CITED

The following references are of record in the file of this patent:

Lord: Everybody's Cook Book, 1924 ed., Henry Holt and Co., additional pages 592, 595.

Lord: Everybody's Cook Book, Revised Ed. (1937), Harcourt, Brace and Co., N. Y., pages 584, 589, 590.

Beeton: Book of Household Management, Ward, Lock and Tyler, London, 1869, pages 626 and 633.